J. H. HERTNER & DE WITT C. COOKINGHAM.
JIG FOR HOLDING ARTICLES DURING MACHINING.
APPLICATION FILED JULY 12, 1909.
995,537.
Patented June 20, 1911.
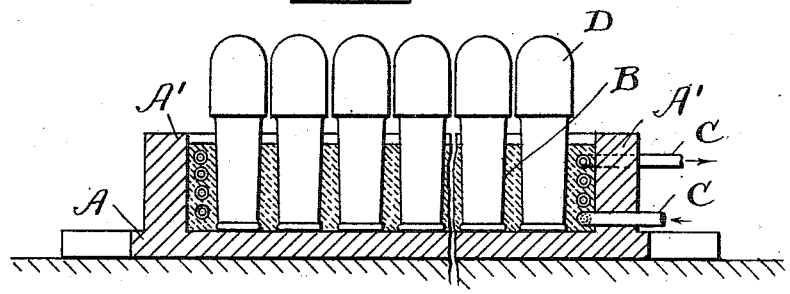
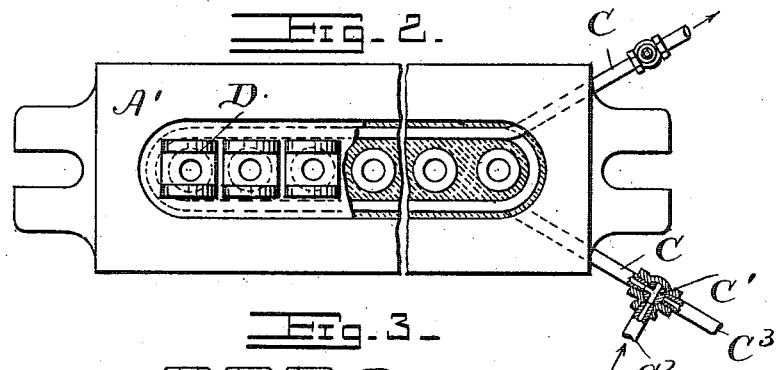
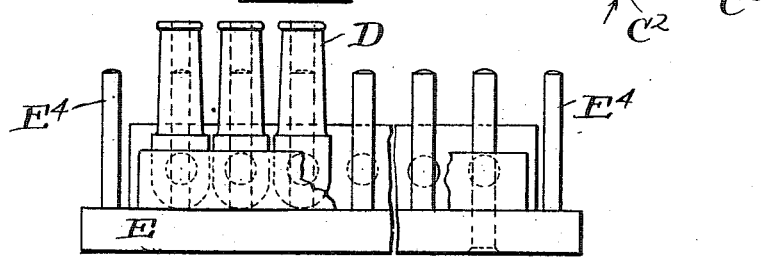
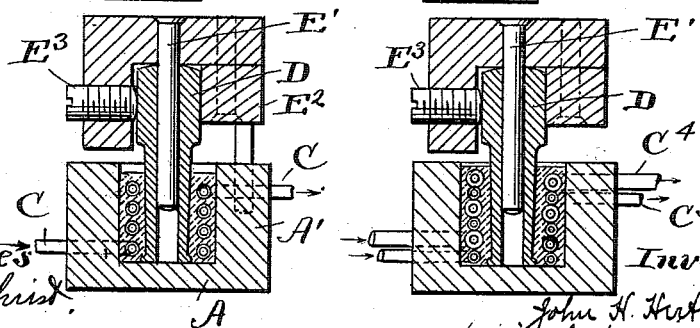

UNITED STATES PATENT OFFICE.

JOHN H. HERTNER AND DE WITT C. COOKINGHAM, OF CLEVELAND, OHIO, ASSIGNORS TO THE RAUCH AND LANG CARRIAGE COMPANY, OF CLEVELAND, OHIO, A CORPORATION OF OHIO.

JIG FOR HOLDING ARTICLES DURING MACHINING.

995,537.   Specification of Letters Patent.   Patented June 20, 1911.

Application filed July 12, 1909. Serial No. 507,099.

*To all whom it may concern:*

Be it known that we, JOHN H. HERTNER and DE WITT C. COOKINGHAM, citizens of the United States, and residents of Cleveland, in the county of Cuyahoga and State of Ohio, have invented a certain new and useful Improvement in Jigs for Holding Articles During Machining, of which the following is a full, clear, and exact description.

The present invention is directed to a jig for securing articles for the purpose of machining them.

The object of the invention has been to provide means by which articles may be secured either singly or in groups in such manner as to save the time ordinarily lost in properly adjusting the various clamps commonly used, and it is a further object of the invention to provide such means as shall prevent the springing of the articles held.

A still further object has been to provide means for securing a number of articles of similar construction so that they may be simultaneously machined or machined by the same tool and insure that they shall be so held as to receive exactly the same treatment.

The above objects it will be seen are attained by the invention described in the following specification with reference to the accompanying drawings, in which—

Figure 1 is a cross section of a trough-shaped jig holding therein certain articles in position to be operated on by a milling tool. Fig. 2 is a plan view of the same part in section. Fig. 3 is a side elevation showing a leveling board used for securing alinement of a plurality of similar articles to be placed in the jig. Fig. 4 is a cross section showing the leveling board holding an article in proper position in the jig. Fig. 5 is a cross section similar to that of Fig. 4 with an alternative construction of piping.

The means which we have devised for holding the articles to be machined embodies the broad idea of sustaining in the pocket or trough of the jig a body of readily fusible material, which pocket shall be provided with means for readily fusing the material and readily cooling it for solidification.

A simple form of jig A is shown in Figs. 1 and 2 as provided with a cup A' holding a readily fusible material B such as some of the well known lead, tin, bismuth alloys. It is obvious that any alloy used should not effect the article deleteriously. In this cup we provide some suitable heating means such as the conduit C shown through which steam may be passed at will. This conduit appearing in Figs. 1, 2, 3 and 4 is controlled at its inlet end preferably by means of a two-way cock C' through which connection may be made to the steam pipe $C^2$ or to the water pipe $C^3$. As an alternative form of construction separate pipes $C^4$ and $C^5$, as shown in Fig. 5, may be used for the steam and water respectively.

Many forms of the jig may obviously be constructed and the general form will depend very largely upon the shape and size of the articles to be machined. In the illustration here shown the articles D are small and similar so that the trough form of jig is suitable for the purpose. In the use of the invention that portion of the article to be machined which will best serve as the holding portion is inserted into the molten alloy after the latter has been melted by turning the steam through the conduit. The article is then adjusted in position and the steam turned off. Preferably cold water is then turned into the conduit and the alloy will harden within a few seconds, holding the article rigidly within the jig and in position for machining without further trouble. After the machining operation has been completed steam is again turned into the conduit until the alloy melts and the machined article can then be withdrawn therefrom and the steam turned off. The alloy ordinarily used hardens at atmospheric temperature so that the alloy left in the cup solidifies and is retained for further use.

One of the particular advantages of our jig is the fact that by it we are able to quickly and readily aline a number of articles for machining without wasting such a great amount of time as would be necessary if these several articles were held in separate clamps, it being a practical impossibility to rigidly hold several castings in a single clamp owing to slight variations in the size of the parts so held. The means which we employ for securing the proper alinement or leveling of these articles is a leveling board E on which the articles are placed; the faces to be machined all being placed downward so that absolute leveling is had.

The alinement is properly secured by having suitable pins E' entering sockets in the articles, if there be such sockets, and also by the use of an alining ledge E² and individual holding screws E³.

It will be seen that the articles are readily located and positioned on this board with their holding portions,—that is to say, the portions to be inserted in the holding alloy projecting upward. It is then only necessary to invert the leveling board so that the articles to be machined project into the fused alloy in the jig where they are held until the alloy solidifies. Dowel pins E⁴ may be employed on the leveling board fitted to suitable holes in the jig for the purpose of making it sure that the proper position of the parts is attained.

Articles which, if held by clamps, cannot be prevented from chattering and which require a great amount of time for proper clamping, and also articles which it is impossible to hold in a plurality of clamps without springing may be secured by our invention with a comparatively small time consumption without chattering and without danger of being sprung while being mounted in position.

Having thus described our invention, we claim:

A jig for securing articles to be machined comprising a receptacle, a fusible alloy in said receptacle, and a conduit in the receptacle through which a fluid may pass to alter the condition of the alloy.

In testimony whereof, we hereunto affix our signatures in the presence of two witnesses.

JOHN H. HERTNER.
DE·WITT C. COOKINGHAM.

Witnesses:
 H. R. SULLIVAN,
 E. B. GILCHRIST.

---

Copies of this patent may be obtained for five cents each, by addressing the "Commissioner of Patents, Washington, D. C."